United States Patent [19]

Franco

[11] Patent Number: 5,425,225
[45] Date of Patent: Jun. 20, 1995

[54] TELESCOPIC EXTENSIBLE ROD FOR AGRICULTURAL TOOLS FOR PICKING FRUIT FROM TREES OR FOR CUTTING OFF BRANCHES OF TREES

[75] Inventor: Drusiani Franco, Bologna, Italy

[73] Assignee: M.A.I.BO. S.r.l., Bologna, Italy

[21] Appl. No.: 299,554

[22] Filed: Sep. 1, 1994

[30] Foreign Application Priority Data

Feb. 8, 1994 [IT] Italy .................... B09400016 U

[51] Int. Cl.[6] ................. A01D 46/00; A01D 46/24; F16L 27/12
[52] U.S. Cl. .................... 56/332; 285/302; 285/323; 403/314; 403/370
[58] Field of Search ........... 56/332, 11.9; 285/298, 285/302, 322, 323, 301; 403/314, 297, 370, DIG. 8; 254/93 R; 92/51, 52, 53; 30/296.1, 517, 340

[56] References Cited

U.S. PATENT DOCUMENTS

| | | | |
|---|---|---|---|
| 1,095,926 | 5/1914 | Powell | 285/302 X |
| 1,295,106 | 2/1919 | Bowlzer | 285/298 |
| 1,355,946 | 10/1920 | Dietrich et al. | 285/302 X |
| 2,228,635 | 1/1941 | Magennis | 30/245 |
| 3,175,329 | 3/1965 | Beckman | 56/332 X |
| 3,237,289 | 3/1966 | Green | 56/328 |
| 3,284,114 | 11/1966 | McCord, Jr. et al. | 285/302 X |
| 3,466,062 | 9/1969 | Deplante | 285/302 X |
| 3,791,624 | 2/1974 | Payson | 285/298 X |
| 3,837,689 | 9/1974 | Csatlos | 285/302 |
| 4,953,905 | 9/1990 | Cohen | 285/302 X |
| 5,083,418 | 1/1992 | Reece | 56/239 |

OTHER PUBLICATIONS

Modified Abstract of European Patent Application No. 94830418.3.
European Search Report dated Feb. 2, 1995.

*Primary Examiner*—Stephen J. Novosad
*Attorney, Agent, or Firm*—McAulay Fisher Nissen Goldberg & Kiel

[57] ABSTRACT

A telescopic extensible rod, suited to be used as extension in agricultural pneumatic tools for picking fruit from trees or of cutting off branches of trees, is formed by two coaxial tubular elements, i.e. a first tubular element and a second tubular element that slides inside the first tubular element. A pneumatic actuator can be connected to the free end of the second tubular element. A coupling is mounted between the tubular elements to removably lock their reciprocal sliding. Two coaxial pipes, a first pipe and a second pipe, are located inside the tubular elements, the second pipe being designed to slide inside the first one while keeping the seal because of the presence of a sleeve mounted between the pipes and inside the first pipe. The free ends of the pipes are in fluid-dynamic connection respectively with a compressed fluid delivery and with the pneumatic actuator.

4 Claims, 1 Drawing Sheet

U.S. Patent  June 20, 1995  5,425,225
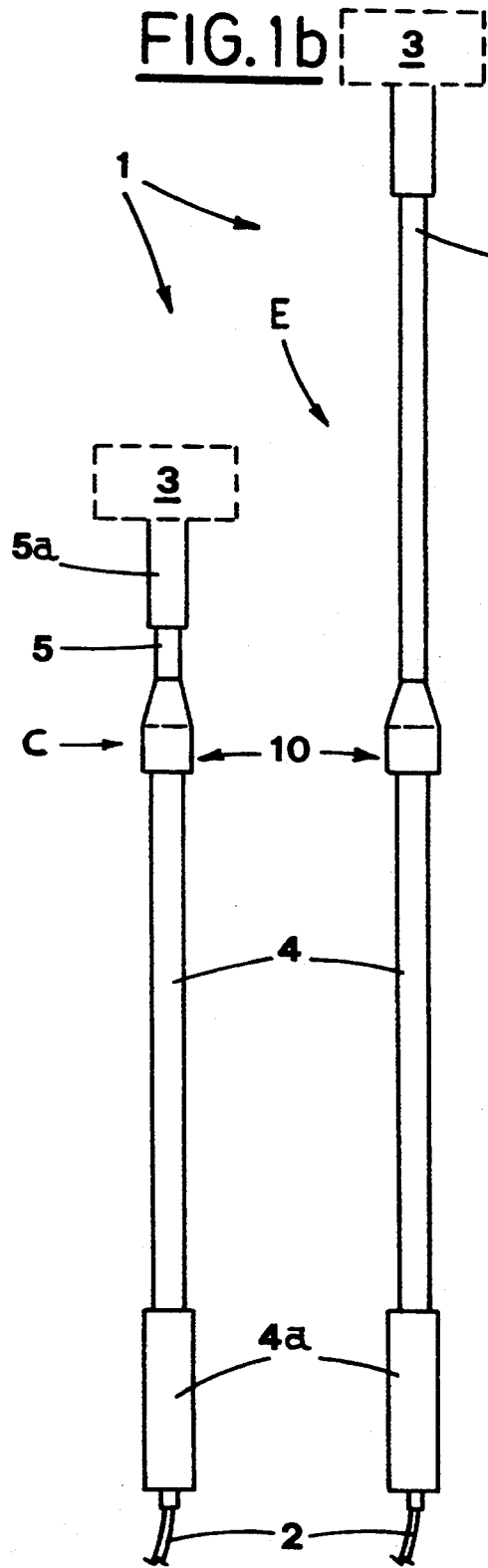
FIG.1b
FIG.1a
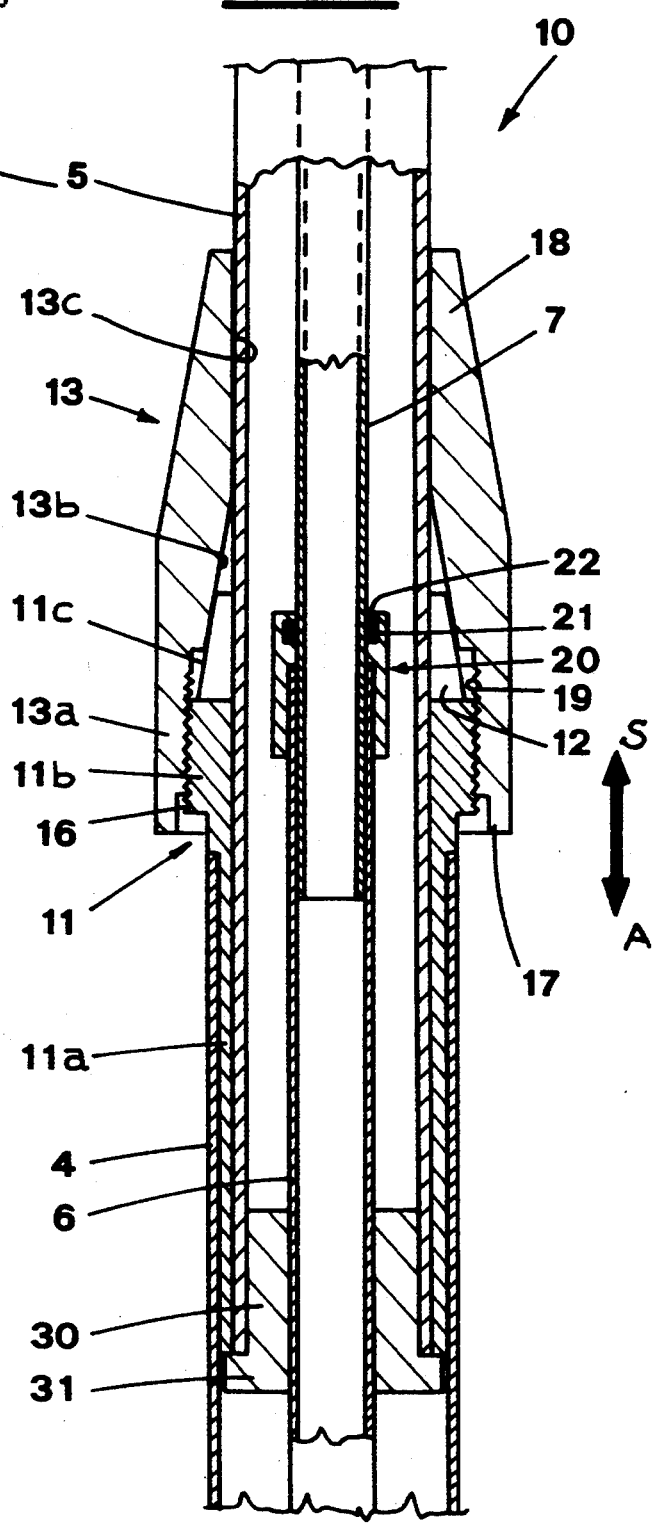
FIG.2

TELESCOPIC EXTENSIBLE ROD FOR AGRICULTURAL TOOLS FOR PICKING FRUIT FROM TREES OR FOR CUTTING OFF BRANCHES OF TREES

BACKGROUND OF THE INVENTION

The present invention relates to the technical field concerning the agricultural equipment used for picking fruit from the trees or for cutting off branches of trees.

In particular, the present invention concerns a rod used as a telescopic extension, designed to be connected to a source of a fluid under pressure, at one end, and to a pneumatic actuator at the other end, the rod being capable of maintaining a fluid seal with any extension.

DESCRIPTION OF THE PRIOR ART

It is known that fruit picking, or cutting off the branches of the trees, involves the use of various pneumatic actuators fastened to the end of a hollow rod having a pro-fixed length, while the remaining end of the rod is connected to a source of a fluid under pressure (generally compressed air).

In such a way the rod not only supports the pneumatic actuator, but serves also as pneumatic connection pipe between the actuator and the source of the fluid under pressure, that is used to activate the same actuator. The connection is completed by the interposition of a handle equipped with a valve.

While using this tool, it is necessary to compensate the differences in distance between the fruits to be picked or the branches to be cut off and the operator, since the hollow rod has a fixed length.

In order to facilitate adaptation of the rod, and often to make it possible, the agricultural tools of this type are equipped with extension tubes having fixed and predetermined length, interchangeable but not mutually connectable; in fact, generally fixed extensions of 0.5, 1, 2 and 3 meters are supplied.

With the help of such extensions the operator can connect the pneumatic actuator and the source of fluid under pressure by means of an extension rod that has a length as similar to the distance between the fruit and/or the branch and the operator, as possible.

The above described feature points out the lack of functional capacity in use of the agricultural tool of this type, since the operator must choose the proper extension rod before the tool is used and often he may have to substitute such a rod with another one, of different length, even during the use of the same tool.

To remove this disadvantage, it is known to sue a telescopic extension with the pneumatic actuator connected to its distal end while the hydraulic connection between the said pneumatic actuator and the source of pressurized fluid is formed by a flexible spiralled hose.

Though this solution overcomes the problem of the fixed extensions, by virtue of the easy adaptability of the telescopic rod to different requested lengths, nevertheless it presents other disadvantages.

The first one results from the fact that the fluid under pressure loses its pressure while passing through the spiralled hose due to the particular shape of the latter that, obviously, has turns and a longitudinal extension much longer than the maximum length of the telescopic rod.

This is followed by a considerable amount of fluid under pressure contained in the spiralled hose being wasted and consequently the delay and/or slowness of the activation or deactivation of the pneumatic actuator is increased.

Another drawback of the spiralled hose is related to its considerable size and, consequently, to the obstacles that it creates while the agricultural tool is used.

SUMMARY OF THE INVENTION

The main object of the present invention is to propose a telescopic rod particularly suitable as extension rod in agricultural pneumatic tools for picking fruit from thé trees or for cutting off the branches of trees, said telescopic rod being able to create an internal fluid dynamic connection between its two ends.

Another object of the present invention is to propose a telescopic rod that is strong and, at the same time, extremely light and completely safe and, moreover, that complies with the severest accident prevention requirements, without affecting the manufacture cost.

A further object of the present invention is to propose a telescopic rod easy to install, use and extremely reliable.

The above mentioned objects are achieved by a telescopic extensible rod particularly suited to be used as extension rod for agricultural tools for picking fruits from trees or for cutting branches of trees, the said rod having a lower end to be connected to the delivery of a source of fluid under pressure, as well as an upper end to which an actuator can be associated.

The rod includes: at least a first tubular element, inside which there is sliding at least a second tubular element, the said pneumatic actuator being associated to the upper end of the second tubular element, that is always outside the said first tubular element; at least a coupling for joining the said first tubular element and second tubular element, the said coupling being designed to removably lock the reciprocal sliding of the tubular elements in any position comprised between two extreme configurations, respectively a minimum extension configuration and a maximum extension configuration for the same rod; at least two coaxial pipes, namely a first pipe inside which there is sliding at least a second pipe, these pipes being located inside said tubular elements, so that the lower end of the said first pipe, that is bound to the said lower end of the said first tubular element, can be connected to a delivery coming from a source of fluid under pressure, and so that the said pneumatic actuator can be connected to the upper end of the second pipe that is bound to the said upper end of the said second tubular element; at least a sleeve, partially surrounding the said pipes first and second, the said sleeve being fastened to the remainder of the ends of the said first pipe and designed to keep a fluid-dynamic seal between the said pipes.

BRIEF DESCRIPTION OF THE DRAWINGS

The characteristics of the present invention are pointed out in the following with reference to the attached drawings, in which:

FIG. 1a shows a lateral view of the telescopic rod, that is the subject of the present invention, in a minimum extension position;

FIG. 1b shows a lateral view of the telescopic rod in a maximum extension position;

FIG. 2 shows a sectioned, enlarged view of the intermediate coupling of the telescopic rod.

DESCRIPTION OF THE PREFERRED EMBODIMENT

With reference to the FIGS. 1a, 1b and 2, the reference number 1 indicates a telescopic extensible rod. The lower end 4a of the telescopic rod has normally a handle, that is of known type and therefore not illustrated, while the upper end 5a of the rod has a pneumatic actuator 3 removably fastened thereto.

An agricultural tool, that is known and not illustrated, is associated to the pneumatic actuator. The rod 1 is formed by two coaxial tubular elements, i.e. a first tubular element 4, inside which a second tubular element 5 can slide.

The pneumatic actuator 3 can be bound to the second tubular element upper end 5a that is always outside the tubular element 4.

With particular reference to the FIG. 2, the reference number 10 indicates a coupling connecting the first tubular element 4 with the second tubular element 5. Such coupling 10 is formed by a locking element 13 and an elongate annular element 11, inside which the second tubular element 5 slides.

The outside of the elongate annular element 5 is so shaped as to form mutually adjacent portions, first 11a, second 11b, and third 11c, respectively.

The first portion 11a is substantially constituted by a tube, located between the tubular elements 4 and 5 and fixed to the internal surface of the first tubular element 4, in correspondence with the end of the latter facing the second tubular element 5.

The second portion 11b is formed by a ring, having a diameter not smaller than the external diameter of the first tubular element 4. The lateral surface of such ring features a threading 16.

The third portion 11c, shaped like a truncated cone, has four slits 12, angularly equidistant from each other, that extend from the free head of the third portion toward the second portion 11b, until they reach the latter.

The locking element 13, that can be joined to the elongated annular element 11, is substantially made of a hollow tapered cap that outside has a cylindrical portion 17 and a truncated cone portion 18, while inside the cap there are three adjacent portions respectively lower 13a, intermediate 13b and upper 13c.

The lower portion 13a has a threading 19 that can engage with the corresponding threading 16 of the annular element 11.

The intermediate portion 13b is shaped in such a way that it results to be complementary to the third truncated cone portion 11c of the annular element 11. The upper portion 13c is cylindrical and faces the second tubular element 5.

Still with reference to the FIG. 2, two coaxial pipes, respectively first 6 and second 7, are located inside the tubular elements 4 and 5. The second pipe 7 slides inside the first pipe 6.

The lower end of the first pipe 6 is bound to the lower end 4a of the first tubular element 4, so that it is possible to connect a source of fluid under pressure thereto; the source of fluid under pressure is known and therefore not illustrated.

The inlet of the pneumatic actuator 3, that is known and therefore not shown, can be joined to the upper end of the second pipe 7 that is bound to the upper end of the second tubular element 5.

Therefore, the pipes 6 and 7 establish a flow connection between the delivery 2 and the pneumatic actuator 3.

A sleeve 20 is at one side partially and externally fixed to the remaining end of the first pipe 6, and at the other side it allows the second pipe 7 to freely slide through itself.

The seal between the pipes is made by seal element 22, that has such internal diameter that assures the continuous contact, and thus tightness, with the external surface of the second pipe 7.

The seal 22 is partially housed inside a throat 21 made in the portion of the internal surface of the sleeve 20, that faces the second pipe 7.

A cylindrical hollow spacer 30, bound to the internal surface of the second tubular element 5, in correspondence with the remainder of the tubular element ends, is placed between the first pipe 6 and the second tubular element 5, so as to guide the second tubular element and to keep it always coaxial in its sliding with respect to the same first tube.

Such spacer 30 is also provided with a head 31, turned toward the delivery 2, that together with the head of the first portion 11a of the elongated annular element 11, constitutes a stop: in this way the withdrawing of the second tubular element 5 from the first one 4 is avoided.

The operation of the rod 1 is extremely simple, since the operator, after having connected the pneumatic actuator 3 to the upper end 5a of the rod 1 and the delivery 2 to the lower end of the first pipe 6, acts on the coupling 10, i.e. unscrews the locking element 13 in order to allow for mutual and free sliding of the tubular elements 4 and 5, in accordance with directions S and A, between two extreme configurations C, minimal extension of the rod 1, and E, maximum extension of the same rod 1, respectively.

The reciprocal and free sliding of the second pipe 7 inside the first pipe 6 occurs together with the relative sliding between the first 4 and the second 5 tubular elements, while the sleeve 20 assures the continuous tightness between such pipes 6 and 7, due to the interposition of the seal 22.

In this way the operator can suitably choose the desired extension for the rod 1, on the basis of the actual distance between himself and the fruits to be picked and/or the branch to be cut.

Then the operator tightens the locking element 13, that is performs a screwing action on it, thus causing the intermediate portion 13b to slide on the third portion 11c of the annular element 11.

This sliding provokes a progressive pressure on the third portion 11c, in adjacency of its upper head, that is pushed against the outer surface of the second tubular element 5, and therefore the same third portion decreases in diameter, this being made easier because of the presence of the slits 12, also located near the upper head of the portion 11c.

At the end of this screwing phase, the coupling 10 locks the first tubular element 4 and the second tubular element 5 one to the other, thus making the rod 1 extremely rigid and solid.

It must be noted that the first tubular element 4, as well as the second element 5, can be made with electrically insulating material, but in the same time extremely strong; in this way the rod 1 complies also with the very strict law requirements for accident prevention.

The main advantage of the present invention is the production of a telescopic extensible rod particularly suited to be used as an extension rod for agricultural pneumatic tools aimed at picking fruits from trees or cutting branches of trees, the rod being able to make a fluid under pressure-tight fluid dynamic connection between its ends, which are respectively connectable to a source of fluid and to a pneumatic actuator.

A further advantage comes from the fact that an extremely strong telescopic rod is produced, that is able to stand the various mechanical stresses that it must undergo when the pneumatic actuator is in operation. In the meantime the rod is extremely light and safe, in that it meets the particularly strict accident prevention laws. However all these characteristics do not affect negatively the production cost of the rod.

Another advantage is that the rod is easy to be set up and to be adjusted in accordance to various distances between the operator and the fruits and/or branches as necessary to be used. The rod is also easy to be used and extremely reliable.

The invention has been obviously described, with reference to the accompanying drawings, as an example only and has not any limitative aim, and therefore it is evident that many modifications or variation, suggested by the practice, may be made in its actuation and use, but anyway they are included in the scope defined by the following claims.

What is claimed is:

1. A telescopic extensible rod particularly suited to be used as extension rod for agricultural tools for picking fruits from trees or for cutting branches of trees, the said rod having a lower end to be connected to the delivery of a source of fluid under pressure, as well as an upper end to which an actuator can be associated, said rod including:
    at least a first tubular element, inside which there is sliding at least a second tubular element, the said pneumatic actuator being associated to the upper end of the second tubular element, that is always outside the said first tubular element;
    at least a coupling for joining the said first tubular element and second tubular element, the said coupling being designed to removably lock the reciprocal sliding of the tubular elements in any position comprised between two extreme configurations, respectively a minimum extension configuration and a maximum extension configuration for the same rod:
    at least two coaxial pipes, namely a first pipe inside which there is sliding at least a second pipe, these pipes being located inside said tubular elements, so that the lower end of the said first pipe, that is bound to the said lower end of the said first tubular element, can be connected to a delivery coming from a source of fluid under pressure, and so that the said pneumatic actuator can be connected to the upper end of the second pipe that is bound to the said upper end of the said second tubular element;
    at least a sleeve, partially surrounding the said pipes first and second, the said sleeve being fastened to the remainder of the ends of the said first pipe and designed to keep a fluid-dynamic seal between the said pipes.

2. Rod as claimed in claim 1, wherein the said coupling includes:
    an elongated annular element, inside which the said second tubular element runs, the said annular element being formed by adjacent portions respectively a first portion, located between the said tubular elements and bound to the free end of the said first tubular element, a second portion, that is threaded, and a third portion, that is shaped like a truncated cone and features at least one slit extending axially;
    a locking element, that is formed by three adjacent portions, respectively a lower portion, that is internally threaded and can engage with the corresponding second portion, also threaded, of the said annular element, an intermediate portion, that is shaped like a truncated cone and complementary to the said third portion of the annular element, this intermediate portion being designed to slide on the said third portion during screwing or unscrewing of the said locking element, and an upper portion, that is cylindrical and surrounds the said second tubular element so as to guide said second tubular element in its axial motion.

3. Rod as claimed in claim 1, wherein the said sleeve features internally a throat, inside which there is housed a seal designed to keep the seal between the said first pipe and the said second pipe.

4. Rod as claimed in claim 1, wherein it further includes a spacer, situated between the first pipe and the second tubular element, said spacer being designed to guide said second tubular element in its axial sliding with respect to the said first pipe, the said spacer also featuring a head that has such external diameter so as to make a stop along with the head of the said first portion of the said elongated annular element, for preventing the second tubular element from going out from the said first tubular element.

* * * * *